United States Patent [19]
Kuroda

[11] Patent Number: 5,485,591
[45] Date of Patent: Jan. 16, 1996

[54] MICROPROCESSOR WHEREIN THE NUMBER OF REGISTER OUTPUT SIGNAL LINER CONNECTED TO THE BUSES ARE REDUCED REDUCING THE LOAD CAPACITY OF THE BUSES

[75] Inventor: Yasuaki Kuroda, Tokyo, Japan

[73] Assignee: NEC Corporation, Japan

[21] Appl. No.: 18,870

[22] Filed: Feb. 17, 1993

[30] Foreign Application Priority Data

Feb. 17, 1992 [JP] Japan .................................. 4-029369

[51] Int. Cl.⁶ ...................................................... G06F 13/00
[52] U.S. Cl. ........................... 395/800; 364/230; 364/247; 364/931.5; 364/DIG. 1; 364/933; 364/DIG. 2; 365/631; 365/189.08; 395/427
[58] Field of Search ....................... 395/425; 365/230.06, 365/189.08, 63; 307/410; 327/382

[56] References Cited

U.S. PATENT DOCUMENTS

| 4,466,097 | 8/1984 | Nose | 370/112 |
|---|---|---|---|
| 4,617,648 | 10/1986 | Kuboki et al. | 365/189 |
| 4,792,891 | 12/1988 | Baba | 395/800 |
| 4,813,020 | 3/1989 | Iwamura et al. | 365/189 |
| 5,021,951 | 6/1991 | Baba | 395/800 |
| 5,173,626 | 12/1992 | Kudou et al. | 307/481 |
| 5,339,448 | 8/1994 | Tanaka et al. | 395/775 |
| 5,377,136 | 12/1994 | Nishio et al. | 365/63 |

Primary Examiner—Tod R. Swann
Assistant Examiner—Frank J. Asta
Attorney, Agent, or Firm—Ostrolenk, Faber, Gerb & Soffen

[57] ABSTRACT

A microprocessor includes a plurality of registers connected to a plurality of buses. Selectors each select one of output signals of the registers to output the selected one of the output signals to one of the buses. The number of the register output signal lines connected to the buses is reduced to reduce a load capacity of the buses and to reduce an occupancy area of register output circuits and a consumption power.

1 Claim, 9 Drawing Sheets

MICROPROCESSOR WHEREIN THE NUMBER OF REGISTER OUTPUT SIGNAL LINER CONNECTED TO THE BUSES ARE REDUCED REDUCING THE LOAD CAPACITY OF THE BUSES

BACKGROUND OF THE INVENTION

The present invention relates to a microprocessor, and more particularly to a microprocessor having high speed buses connected to registers.

DESCRIPTION OF THE RELATED ARTS

Figure 1:
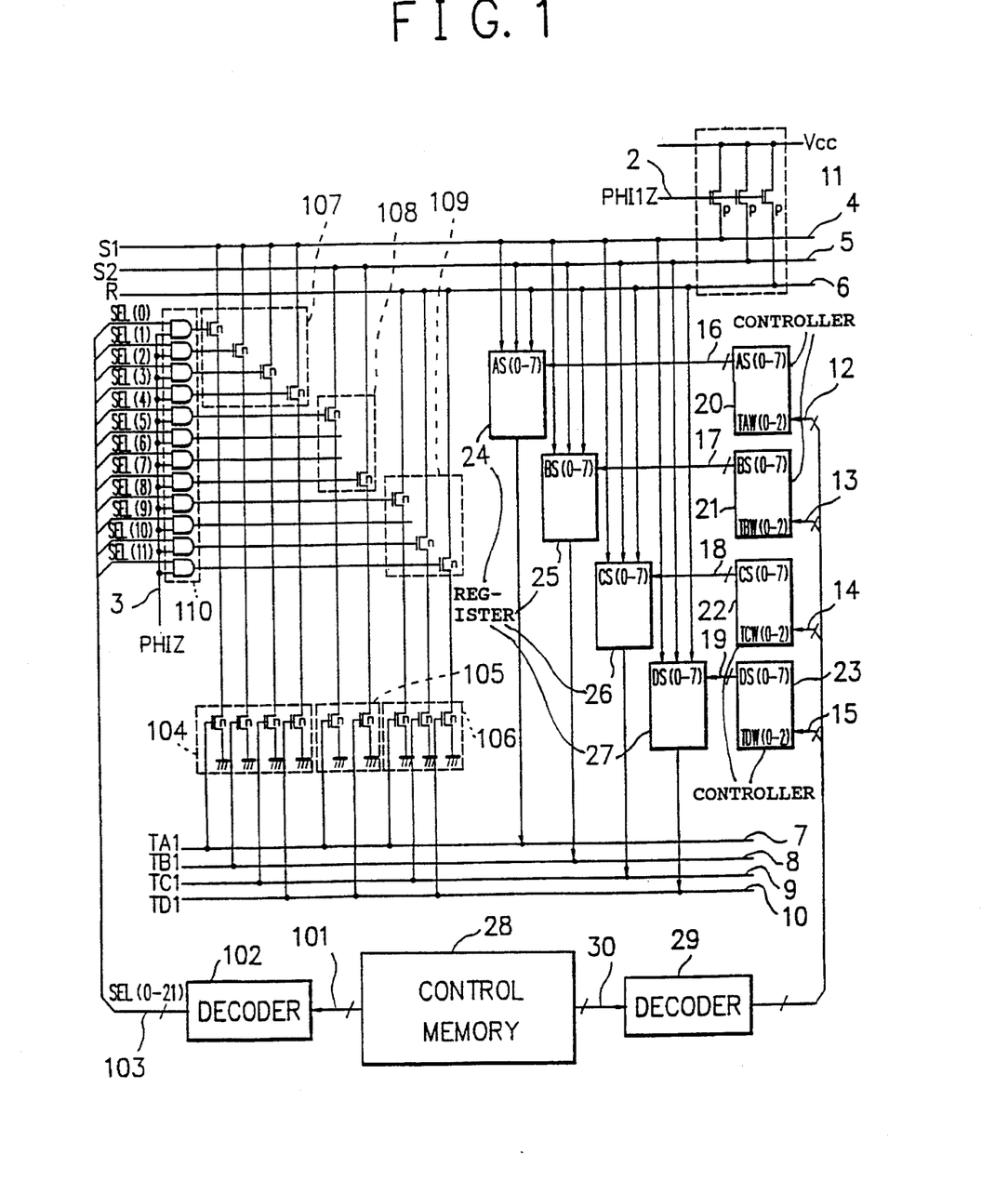
FIG. 1 is a block diagram of a conventional microprocessor.

Conventionally, one microprocessor of this kind is show in FIG. 1. This circuit is comprised of two decoders 29 and 102 for decoding coded control codes 30 and 101 generated by a control memory means 28: an N (N=3 in FIG. 1) number of dynamic buses 4 to 6 to be precharged by a P-channel transistor 11 in synchronism with a PHI1Z clock 2; an M (M=4 in FIG. 1) number of registers 24 to 27 connected to the dynamic buses 4 to 6 for latching data in synchronism with a PHI1 clock 1: controllers 20 to 23 for inputting respective control signals 12 to 15 output from the decoder 29 and for generating respective control signals 16 to 19 for selecting one of the dynamic buses 4 to 6 to be the input of the registers 24 to 27: a number of N-channel transistors 104 to 106 for inputting register output signals 7 to 10 output from the registers 24 to 27 as gate inputs and driving the dynamic buses 4 to 6: a synchronizer 110 for synchronizing a control signal 103 output from the decoder 102 with a PHI2 clock 3: and a number of N-channel transistors 107 to 109 connected in series to the respective N-channel transistors 104 to 106 for inputting the respective signals synchronized with the PHI2 clock 3 in the synchronizer 110 as the input and connecting to the dynamic buses 4 to 6.

Next, the operation of the registers will now be described. The coded control code 30 generated by the control memory means 28 is decoded by the decoder 29 to obtain the control signals 12 to 15, and the controllers 20 to 23 input the control signals 12 to 15 and output the control signals 16 to 19 for selecting one of the dynamic buses 4 to 6. The control signals 16 to 19 control selectors for input signals within the registers 24 to 27, and the registers 24 to 27 latch the data from the selected dynamic buses 4 to 6. On the other hand, the coded control code 101 generated by the control memory means 28 is decoded by the decoder 102 to obtain the strobe signal 103 which selects at most N number of register outputs from the M number of register output signals 7 to IO output from the M number of registers 24 to 27 and outputs the selected register outputs to all or a part of the N number of dynamic buses 4 to 6 without overlapping the dynamic buses as the outputs.

Figure 2:
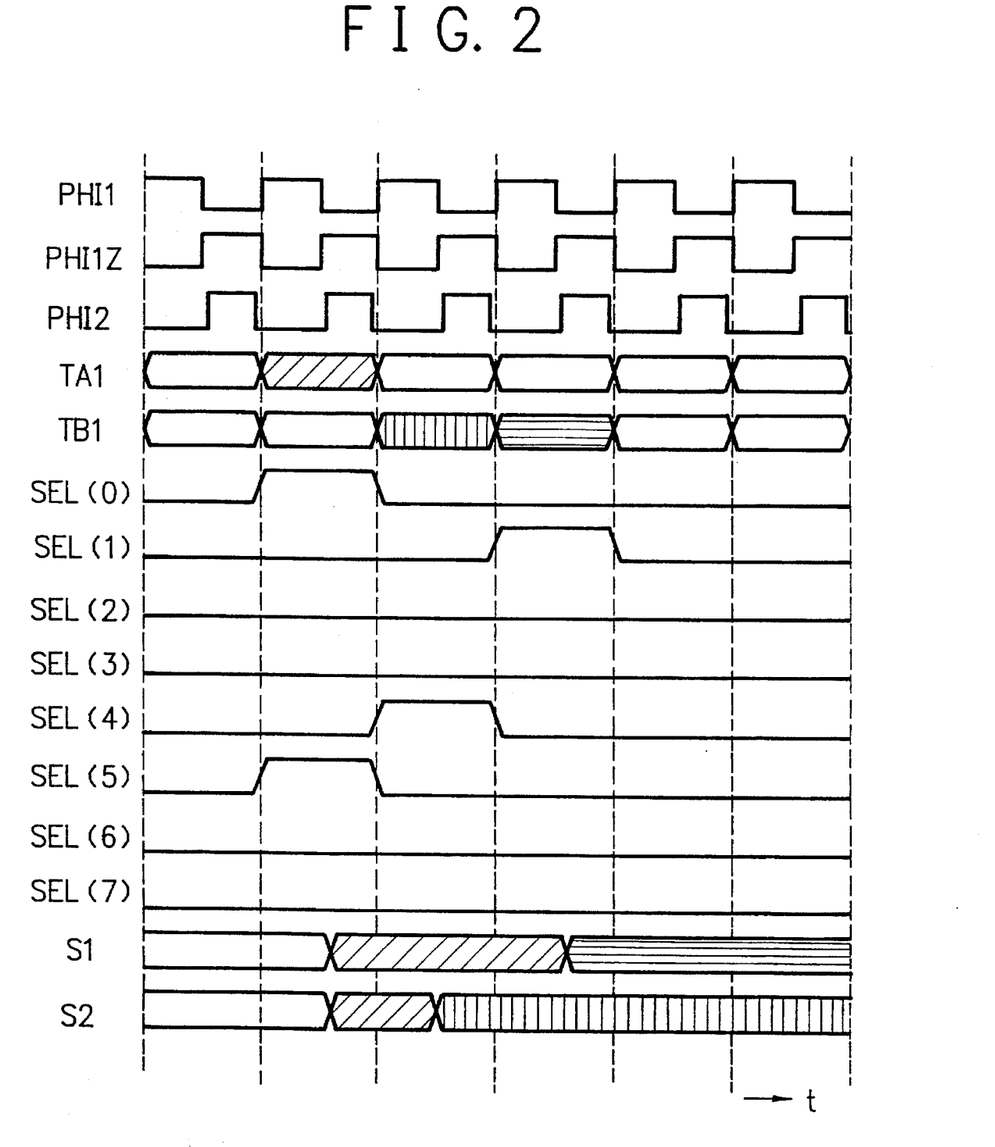
FIG. 2 is a timing chart showing waveforms of signals appearing at portions in FIG. 1.

At this time, the signal waveform of the strobe signal is shown in FIG. 2. The register output signal of one register is output to the dynamic buses 4 to 6 via the N number of N-channel transistors 104 to 106 for driving the N number of dynamic buses 4 to 6 and the N number of N-channel transistors 107 to 109 which are connected in series with the N-channel transistors 104 to 106 and are strobed by the strobe signal 103.

Since the aforementioned conventional microprocessor requires the registers' number of output signal wires of the registers connected to one dynamic bus (4 to 6), in a RISC processor requiring many registers in particular, the electrostatic capacity of the dynamic buses increases in proportion with the number of the registers, and it becomes difficult to operate the dynamic buses at high velocity. Further, in order to operate the dynamic buses at high velocity, it is necessary to enlarge the driving performance of the P-type transistors for precharge and the N-type transistors for discharge. Hence, with the strengthening of the driving performance, a chip area and a consumption power increase.

SUMMARY OF THE INVENTION

It is therefore an object of the present invention to provide a microprocessor in view of the aforementioned defects of the prior art, which is capable of reducing a wiring number to dynamic buses and enabling high velocity operation.

In accordance with one aspect of the present invention, there is provided a microprocessor, comprising a plurality of buses; a plurality of registers connected to the buses; control memory means for storing coded control codes: first decoding means for decoding the control code output from the control memory means to output a first control signal; output selection means controlled by the first control signal output from the first decoding means to select one of a plurality of register output signals output from the plurality of registers; second decoding means for decoding the control code output from the control memory means to output a second control signal; and output control means controlled by the second control signal output from the second decoding means to output the selected one register output signal to one of the plurality of buses.

The output selection means can include register output selection means and a register output selection signal generator.

The register output selection means can include a plurality of clocked inverters and inverters for inverting outputs of the clocked inverters.

The register output selection signal generator can include a plurality of latch circuits and inverters for inverting outputs of the latch circuits.

The output control means can include a register input selection signal generator, and the register input selection signal generator includes a clock synchronizing circuit, a NAND circuit for calculating a NAND of outputs of the clock synchronizing circuit, and inverters for inverting outputs of the clock synchronizing circuit and the NAND circuit.

Each register can include clocked inverters, latch circuits and inverters.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Referring now to the drawings, wherein like reference characters designate like or corresponding parts throughout the views and thus the repeated description thereof can be omitted for brevity, there is shown in FIGS. 3 to 10 one embodiment of a microprocessor according to the present invention.

Figure 3:
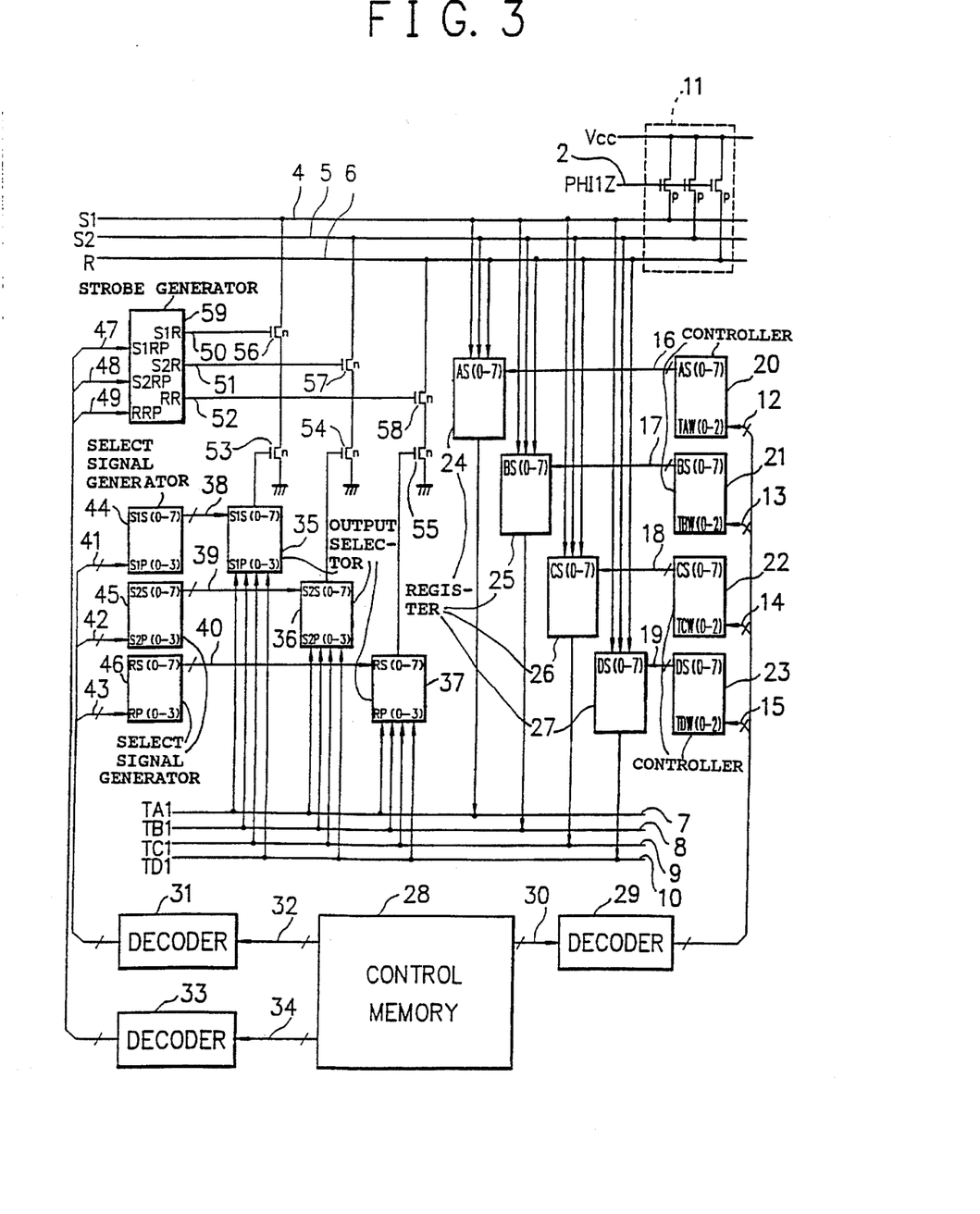
FIG. 3 is a block diagram of one embodiment of a microprocessor according to the present invention.
Figure 4:
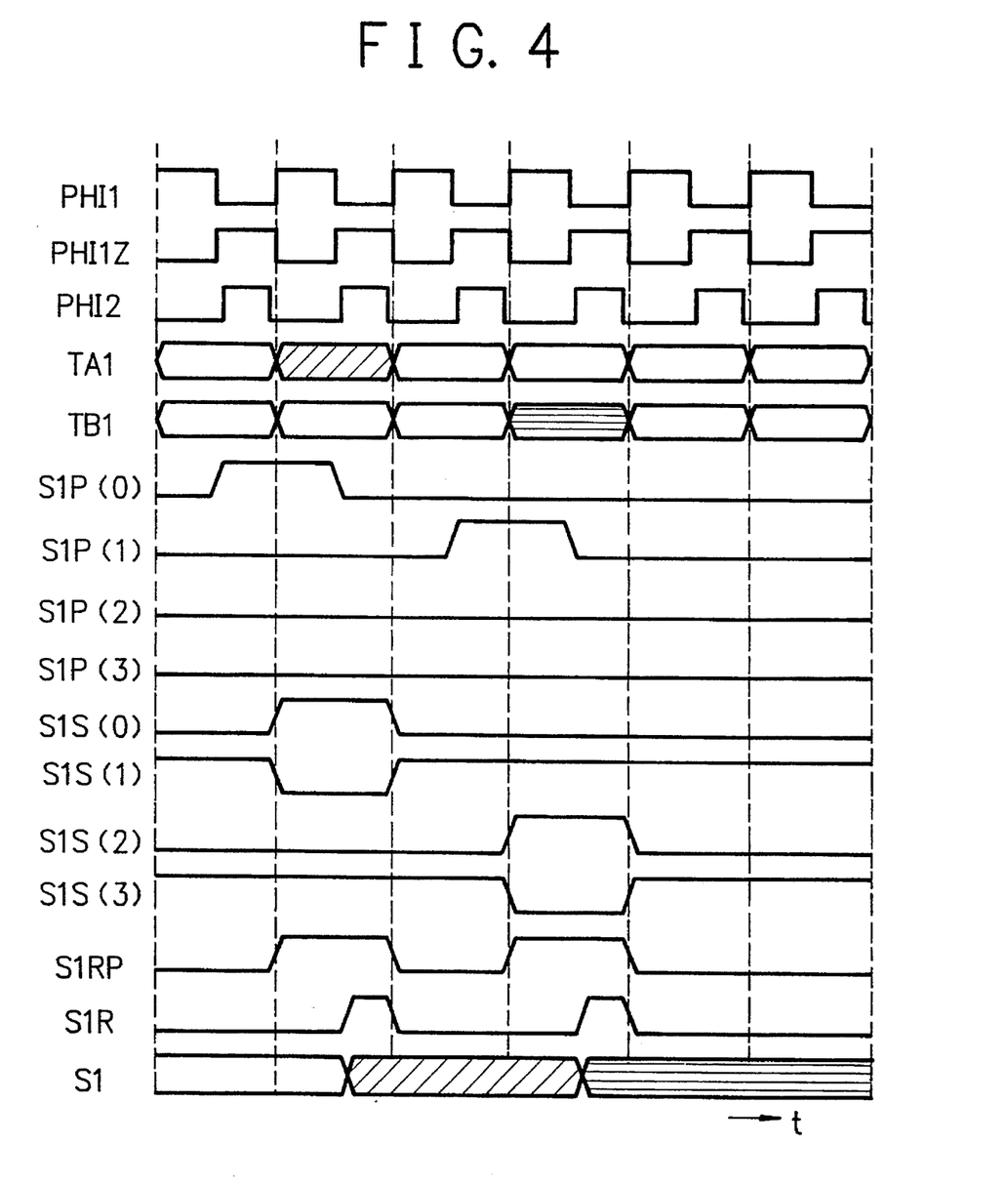
FIG. 4 is a timing chart showing waveforms of signals appearing at portions in FIG. 3.

FIG. 3 is a block diagram of one embodiment of a microprocessor according to the present invention and FIG. 4 shows waveforms of signals for exhibiting operations at portions in FIG. 3.

In this embodiment, the microprocessor is comprised of decoders 31 and 33 for decoding coded control codes 32 and generated by a control memory means 28; a decoder 29 for decoding a coded control code 30 generated by the control memory means 28; an N (N=3) number of dynamic buses 4 to 6 such as S1 bus (4), S2 bus (5) and R bus (6) to be precharged by a P-channel transistor 11 in synchronism with a PHI1Z clock 2; a controller 20 for receiving a TAW control signal which is output from the decoder 29 and is synchronized with a PHI1 clock 1 and for generating an AS control signal 16 for selecting one of the dynamic buses 4 to 6 to be an input of a register 24; a controller 21 for receiving a TBW control signal 13 which is output from the decoder 29 and is synchronized with the PHI1 clock 1 and for generating a BS control signal 17 for selecting one of the dynamic buses 4 to 6 to be an input of a register 25; a controller 22 for receiving a TCW control signal 14 which is output from the decoder 29 and is synchronized with the PHI1 clock 1 and for generating a CS control signal 18 for selecting one of the dynamic buses 4 to 6 to be an input of a resister 26; and a controller 23 for receiving a TDW control signal 15 which is output from the decoder 29 and is synchronized with the PHI1 clock 1 and for generating a DS control signal 19 for selecting one of the dynamic buses 4 to 6 to be an input of a register 27.

Further, assuming that register output signals of the register 24, the register 25, the resister 26 and the register 27 are a TA1 signal 7, a TB1 signal 8, a TC1 signal 9 and a TD1 signal 10, respectively, the microprocessor further includes a controller 44 for generating an S1S control signal 38 synchronized with the PHI1 clock 1 from an S1P control signal 41 generated by the decoder 31; a selection controller 35 controlled by the S1S control signal 38 to select one of the M (M=4) number of register output signals 7 to 10; a controller 45 for generating S2S control signal 39 synchronized with the PHI1 clock 1 from S2P control signal 42 generated by the decoder 31; a selection controller 36 controlled by the control signal 39 to select one of the register output signals 7 to 10; a controller 46 for generating an RS control signal 40 synchronized with the PHI1 clock 1 from an RP control signal 43 generated by the decoder 31; and a selection controller 37 controlled by the RS control signal 40 to select one of the register output signals 7 to 10.

Also, the microprocessor includes a register output strobe signal generator 59 for generating S1R, S2R and RR register output strobe signals 50, 51 and 52 to be sent to the respective S1 bus 4. S2 bus 5 and R bus 6 synchronized with the PHI2 clock 3 from an S1RP control signal 47, S2RP control signal 48 and an RRP control signal 49, respectively, output from the decoder 33.

Further, the microprocessor includes an N-channel transistor 53 for outputting an output signal of the selection controller 35 to and driving the S1 bus 4; an N-channel transistor 56, connected in series to the N-channel transistor 53, for outputting the data sent from the N-channel transistor 53 to the S1 bus 4 in response to the S1R register output strobe signal 50; an N-channel transistor 54 for outputting an output signal of the S2SL selection controller 36 to and driving the S2 bus 5; an N-channel transistor 57, connected in series to the N-channel transistor 54, for outputting the data sent from the N-channel transistor 54 to the S2 bus 5 in response to the S2R register output strobe signal 51; an N-channel transistor 55 driving for outputting an output signal of the selection controller 37 to and driving the R bus 6; and an N-channel transistor 58, connected in series to the N-channel transistor 55, for outputting the data sent from the N-channel transistor 55 to the R bus 6 in response to the RR register output strobe signal 52.

Figure 5:
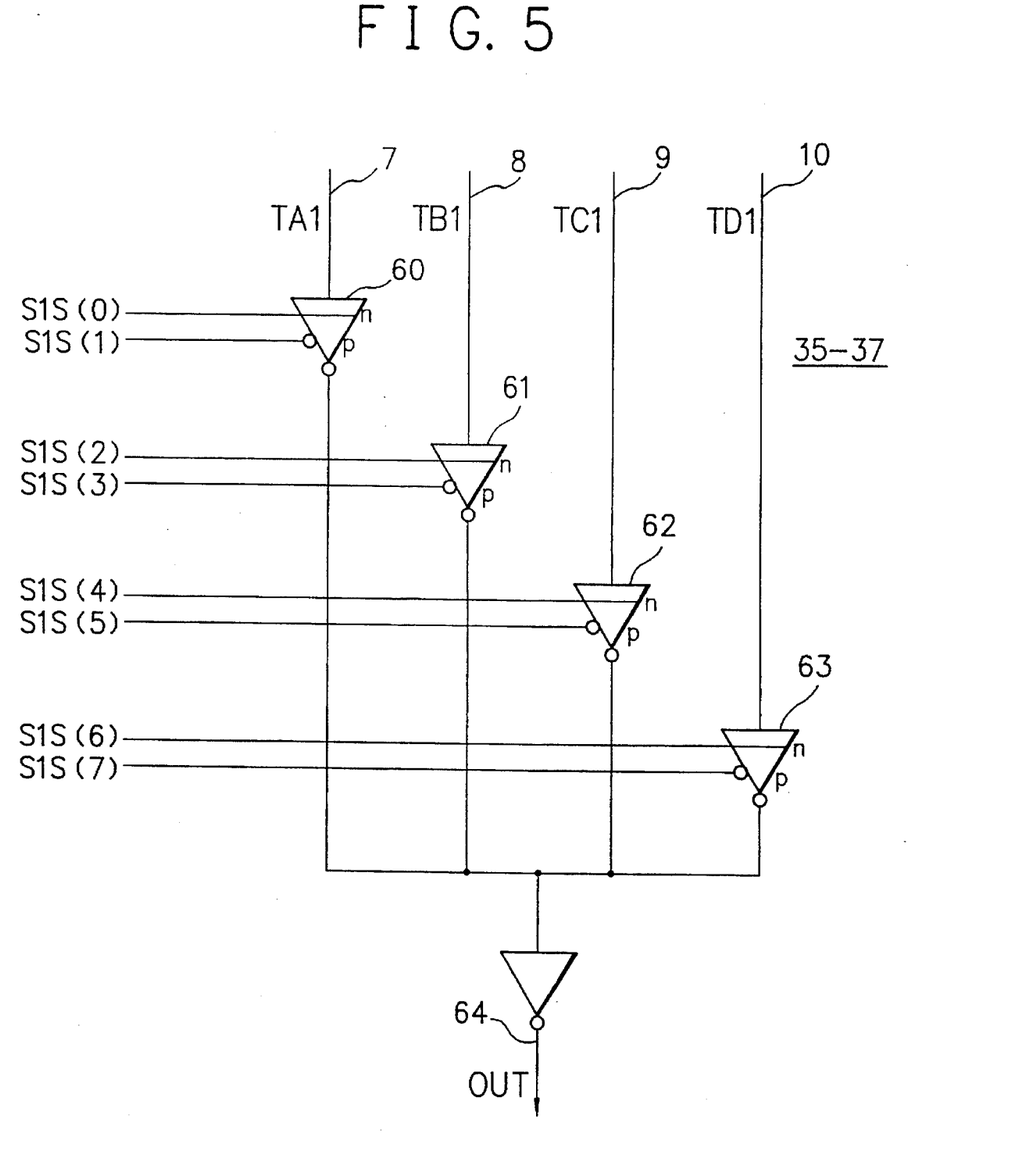
FIG. 5 is a circuit diagram of a register output selector shown in FIG. 3.
Figure 6:
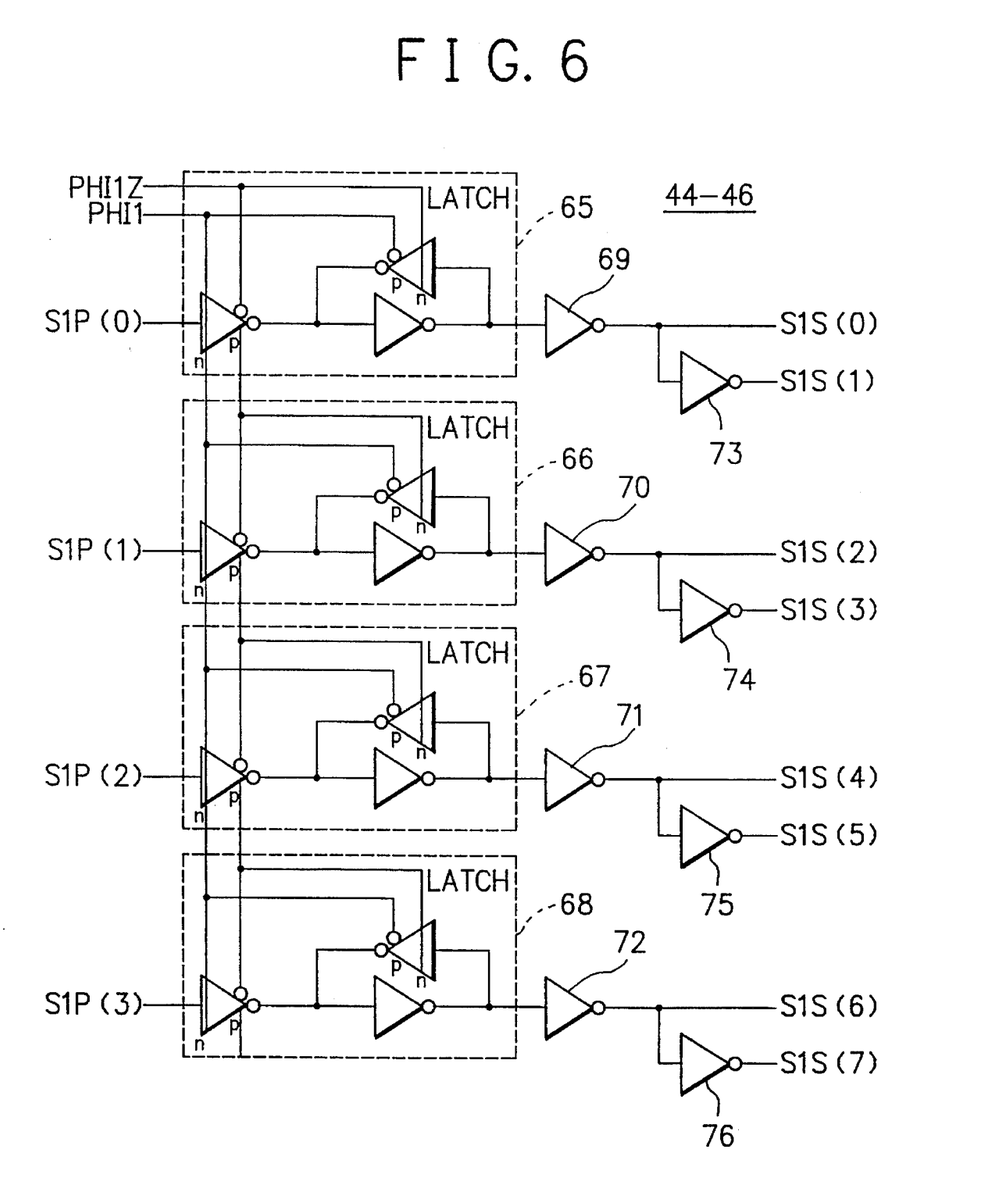
FIG. 6 is a circuit diagram of a register output selection signal generator shown in FIG. 3.
Figure 7:
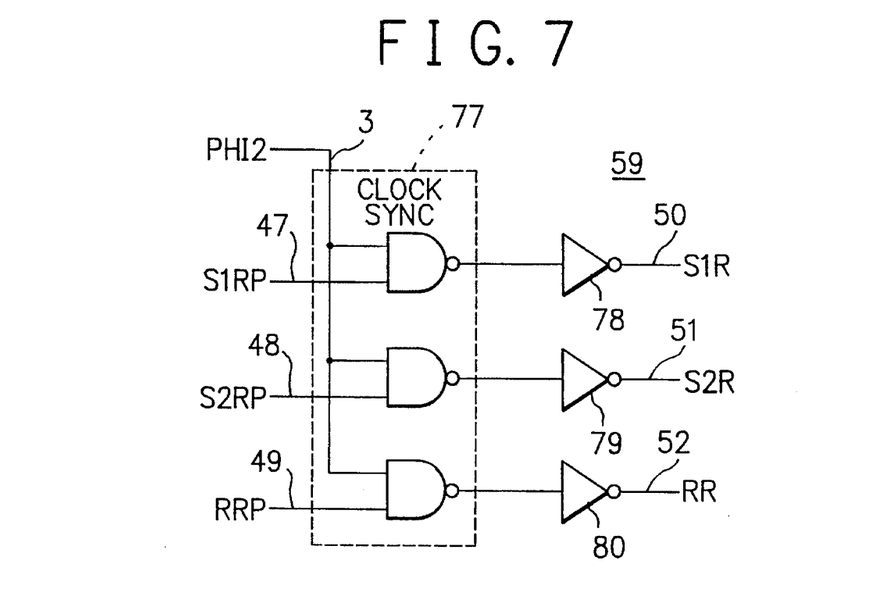
FIG. 7 is a circuit diagram of a register output strobe signal generator shown in FIG. 3.
Figure 8:
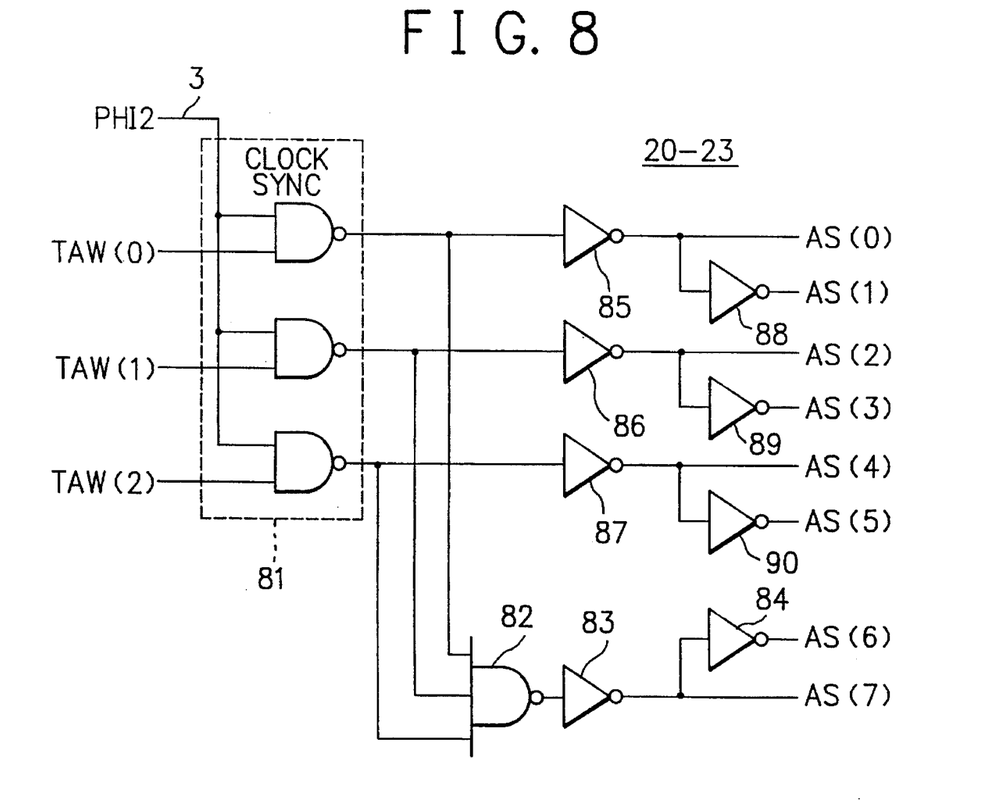
FIG. 8 is a circuit diagram of a register input selection signal generator shown in FIG. 3.
Figure 9:
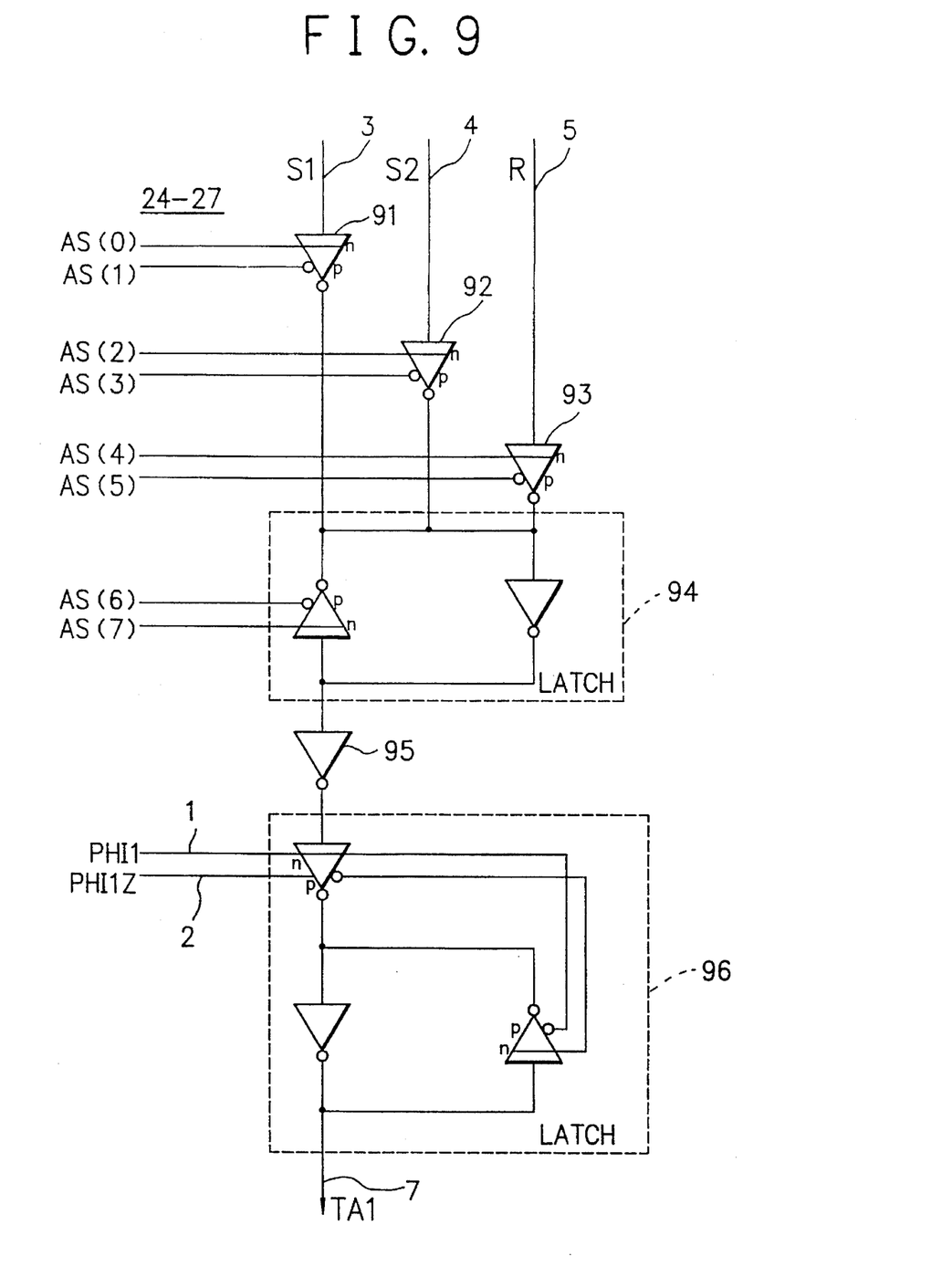
FIG. 9 is a circuit diagram of a register shown in FIG. 3.
Figure 10:
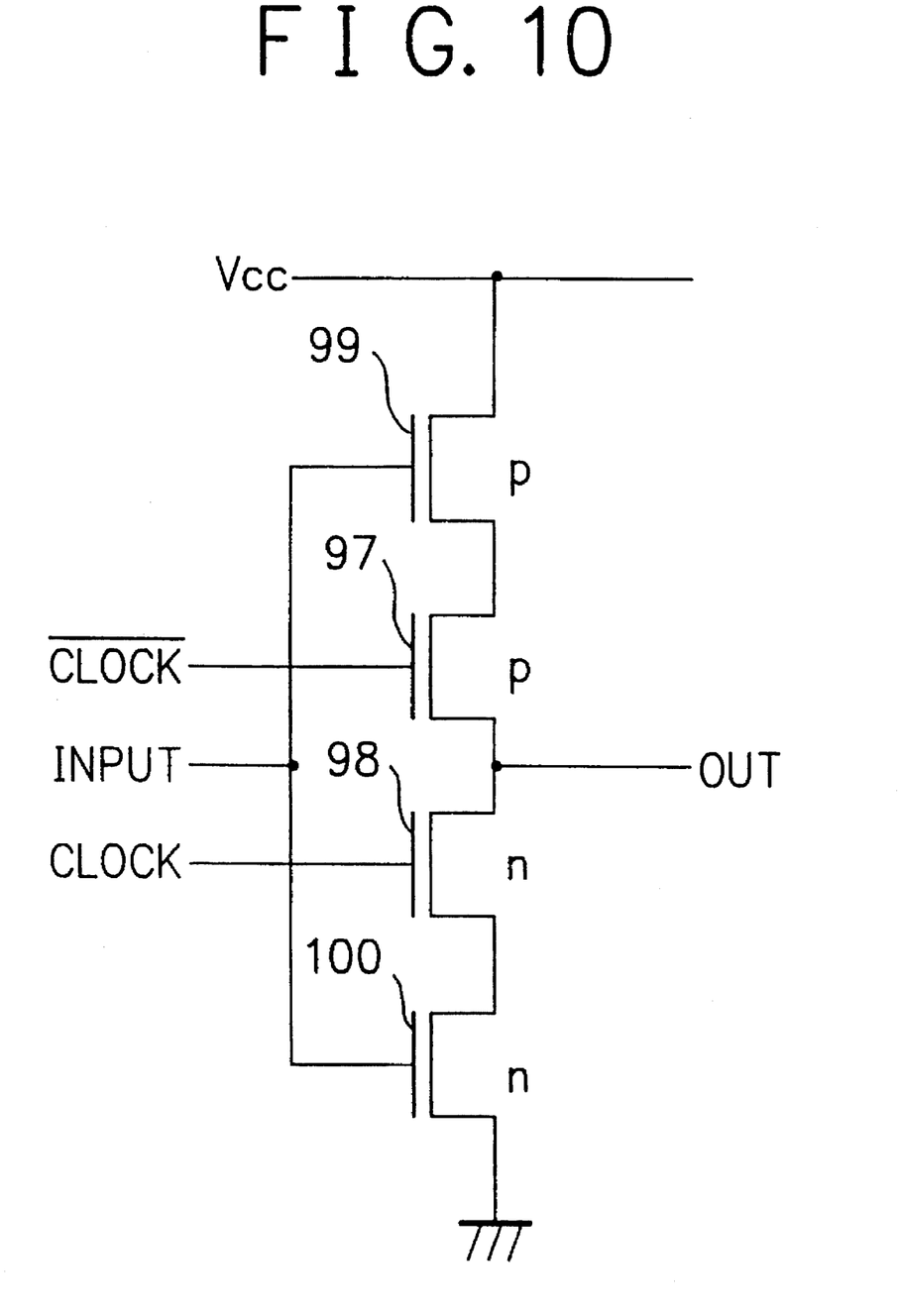
FIG. 10 is a circuit diagram of a clocked inverter used in the microprocessor shown in FIG. 3.

FIG. 5 is a circuit diagram of the selection controller 35, the selection controller 36 or the selection controller 37 shown in FIG. 3. FIG. 6 is a circuit diagram of the controller 44, the controller 45 or the controller 46 shown in FIG. 3. FIG. 7 is a circuit diagram of the register output strobe signal generator 59 shown in FIG. 3. FIG. 8 is a circuit diagram of the controller 20, the controller 21, the controller 22 or the controller 23 shown in FIG. 3. FIG. 9 is a circuit diagram of the register 24, the register 25, the register 26 or the register 27 shown in FIG. 3. FIG. 10 is a circuit diagram of a clocked inverter used in the microprocessor shown in FIG. 3.

The selection controller 35 includes clocked inverters 60 to 63 and an inverter 64 for inverting the outputs thereof, as shown in FIG. 5. The controller 44 includes latch circuits 65 to 68 and inverters 69 to 76 for inverting the outputs thereof, as shown in FIG. 6. The register output strobe signal generator 59 includes a clock synchronizing circuit 77 and inverters 78 to 80 for inverting the outputs thereof, as shown in FIG. 7. The controller 20 includes a clock synchronizing circuit 81, a NAND circuit 82 for the outputs thereof, and inverters 83 to 90 for inverting the outputs thereof, as shown in FIG. 8. The register 24 includes clocked inverters 91 to 93, latch circuits 94 and 96 and an inverter 95, as shown in FIG. 9.

Next, the input operation of the register 24 will now be described. The coded control code 30 generated by the control memory means 28 is decoded by the decoder 29 to obtain the TAW control signal 12 for selecting one of the dynamic buses 4 to 6. Then, the TAW control signal 12 is input to the controller 20, and the controller 20 outputs the AS register input selection signal 16 synchronized with the PHI2 clock 3. The AS register input selection signal 16 controls the clocked inverters 91 to 93 for the register input signal selection within the register shown in FIG. 9 and the register 24 latches the data from the selected dynamic bus.

When the TAW control signal 12 for selecting one of the dynamic buses is not input to the AC controller 20, the TA register 24 is controlled by the output of the NAND circuit 82 of the AC controller 20 shown in FIG. 8, and the latch circuit 94 connected to the clocked inverters 91 to 93 latches the signal input to the register. The latch circuit 96 connected to the output of the latch circuit 94 latches the data of the dynamic bus selected in synchronism with the PHI1 clock 1.

Next, the operation for outputting the output of the register 24 to the S1 bus 4 will now be described. The coded control codes 82 generated by the control memory means 28 is decoded by the decoder 81 to obtain the S1P control signal 41 whose S1P(0) signal is high and S1P(1 to 3) signals are low. The S1P control signal 41 passes through the latch circuits 65 to 68 synchronized with the PHI1 clock 1 within the S1C controller 44 shown in FIG. 6 to become clock signals of the clocked inverters 60 to 68 for selecting one of the register output signals 7 to 10 within the S1SL selection controller 35 shown in FIG. 5. Thus, only the TA1 signal 7 as the output signal of the register 24 is selected and output.

An output signal 64 of the selection controller 35 of the selected TA register 24 is output to the S1 bus 4 via the N-channel transistor 53 for the dynamic bus driving and the N-channel transistor 56 for the strobe, connected in series with the N-channel transistor 53. At this time, the strobe of the N-channel transistor 56 is performed by the S1R register output strobe signal 50 obtained by synchronizing the S1RP control signal 47 output from the decoder 33 with the PHI2 clock 3 within the STB register output strobe signal generator 59 shown in FIG. 7.

Then, the relationship between the bus load capacity and the circuit scale of the register output circuit will now be described with reference to the S1 bus 4. Assuming that the load capacity of the S1 bus 4, the output capacity of the N-channel transistor for the bus driving, the occupancy area of the N-channel transistor for the bus driving, the occupancy area of the N-channel transistor for the strobe, the occupancy area of the N-channel transistor used for the clocked inverters 60 to 63 for the register output selection, and the occupancy area of the P-channel transistor are 10 pF, 1 pF, 100 $\mu m^2$, 100 $\mu m^2$, 10 $\mu m^2$ and 20 $\mu m^2$, respectively, the clocked inverter for the register output selection has the occupancy area of 60 $\mu m^2$. Now, assuming that the occupancy area of the N-channel transistor of the inverter for driving the output of the S1SL selection controller 35, and the occupancy area of the P-channel transistor are 20 $\mu m^2$ and 40 $\mu m^2$, respectively, the occupancy area of the inverter for driving the output of the selection controller 35 is 60 $\mu m^2$. Hence, the occupancy area of the transistors used for driving the S1 bus of 10 pF+1 pF=11 pF=11 pF is 100+100+60×4+60=500 $\mu m^2$.

In turn, in the conventional microprocessor shown in FIG. 1, assuming that the occupancy area of the N-channel transistor for the strobe, the occupancy area of the N-channel transistor for the bus driving and the output occupancy of the same are 100 $\mu m^2$, 100 $\mu m^2$ and 1 pF, respectively, the transistor occupancy area of (100+100)×4=800 $\mu m^2$ for driving the S1 bus of 10 pF+1 pF×4=14 pF is required, and thus for realizing the load capacity of the same S1 bus 4 as that of the present invention, a further large size of N-channel transistor for the bus driving is required. Hence, a further large transistor occupancy area and a power are required.

As described above, according to the present invention, since the number of the register output signal lines connected to the buses can be reduced to one divided by a several number of the conventional circuit, the load connected to the buses can be largely reduced, and thus the buses can be also operated at high velocity in the RISC microprocessor requiring a large number of registers. Further, since the load connected to the buses is small compared with the conventional method, the transistors for driving the buses can be small-sized. As a result, the circuit area and the consumption power can be largely reduced.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A microprocessor comprising:

a plurality of dynamic buses each chargeable and dischargeable to have data established thereon;

a precharge circuit for precharging the plurality of buses in response to a first clock signal a plurality of first switches connected to a common electrode having a ground level, each of said first switches being operable to open and close in response to one of a plurality of first operation signals inputted thereto;

a plurality of second switches each of which is connected between a respective one of the plurality of buses and a respective one of the first switches and is operable to open and close in response to one of a plurality of second operation signals inputted thereto;

a first signal generating means for generating said plurality of second operation signals and selectively outputting the same to the second switches in synchronism with a second clock signal;

a plurality of wiring electrodes;

a plurality of registers each of which is connected at an input side thereof to a respective one of said plurality of buses for latching data therefrom in response to one of a plurality of first select signals inputted to said register and is connected at an output side thereof to a respective one of said plurality of wiring electrodes for clocking out thereon the latched data in response to a third clock signal;

a second signal generating means for generating said plurality of first select signals and selectively outputting the same to the plurality of registers in synchronism with the second clock signal;

a plurality of selectors each of which is connected at an input side thereof to a respective one of said plurality of wiring electrodes for receiving therefrom said clocked out data in response to one of a plurality of second select signals inputted to the selector and is connected at an output side thereof to a respective one of the plurality of first switches for outputting thereto the received data as said one of said plurality of first operation signals;

a third signal generating means for generating said plurality of second select signals and selectively outputting the same to said plurality of selectors in response to said third clock signal; and a control means for controlling said first, second and third signal generating means in synchronism with said first clock signal.

* * * * *

UNITED STATES PATENT AND TRADEMARK OFFICE
CERTIFICATE OF CORRECTION

PATENT NO.  : 5,485,591
DATED       : January 16, 1996
INVENTOR(S) : Yasuaki Kuroda It is certified that error appears in the above-indentified patent and that said Letters Patent is hereby corrected as shown below:

Insert text here...At Item [54], in title of the patent, change "LINER" to --LINES--.

Signed and Sealed this

Eighteenth Day of June, 1996

BRUCE LEHMAN

*Attest:*

*Attesting Officer*  Commissioner of Patents and Trademarks